May 23, 1961 S. MENDELSOHN 2,985,748
MULTIPLE PHOTOFLASH LAMP DEVICE
Filed March 16, 1959 3 Sheets-Sheet 1
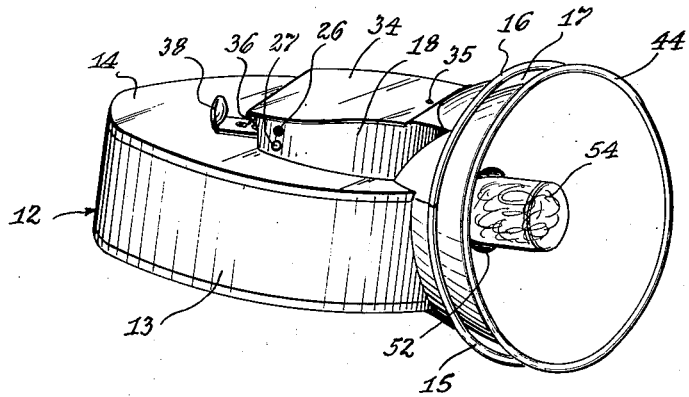
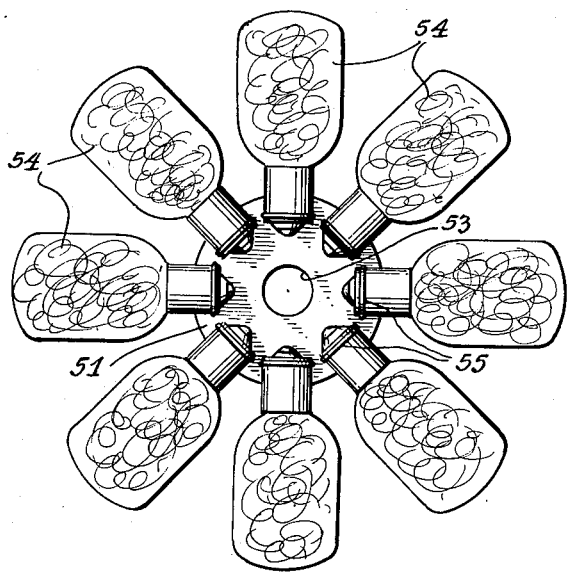
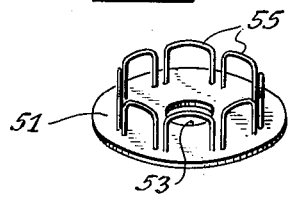
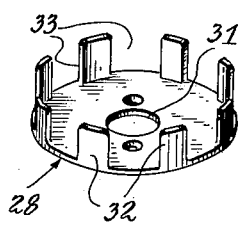
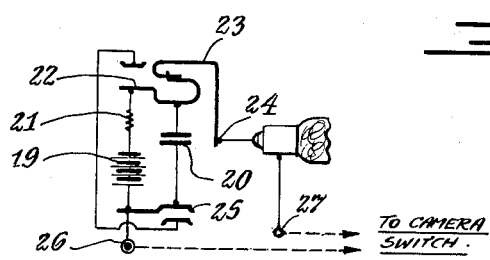
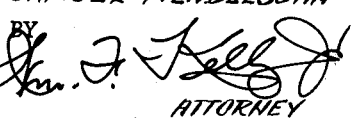
INVENTOR.
SAMUEL MENDELSOHN
ATTORNEY May 23, 1961 S. MENDELSOHN 2,985,748
MULTIPLE PHOTOFLASH LAMP DEVICE
Filed March 16, 1959 3 Sheets-Sheet 2
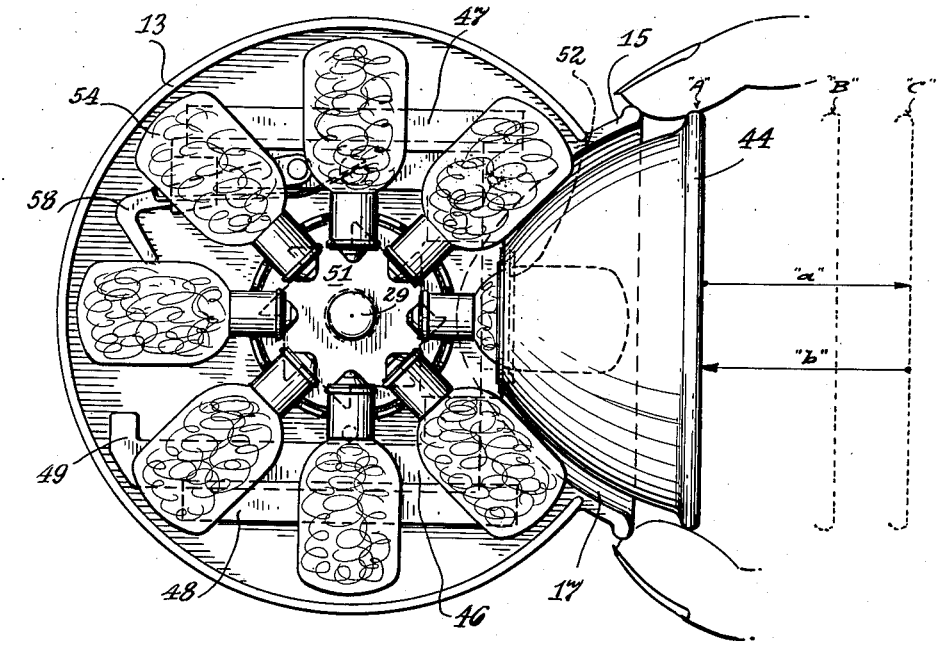
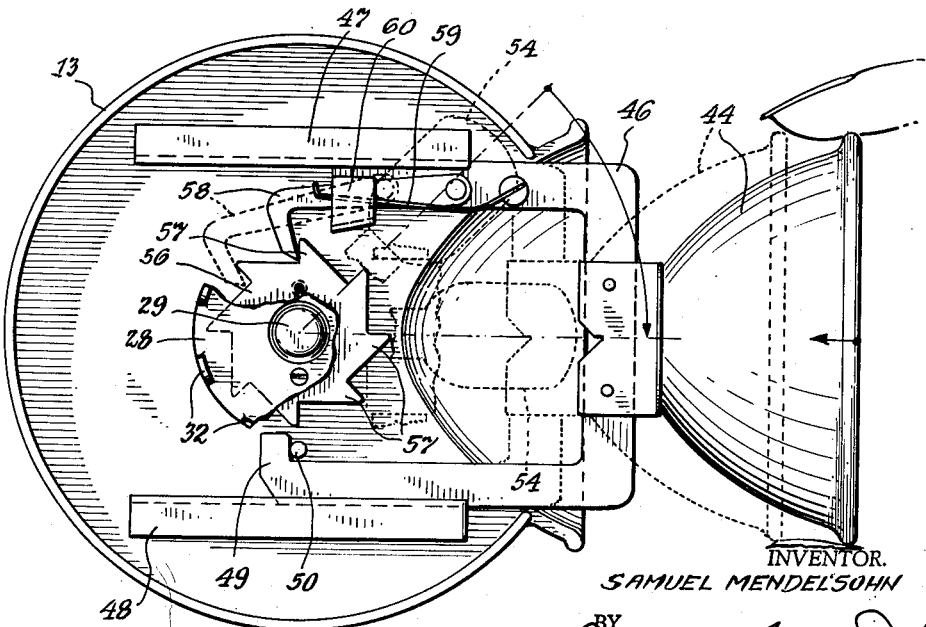
INVENTOR.
SAMUEL MENDELSOHN
BY
ATTORNEY May 23, 1961  S. MENDELSOHN  2,985,748
MULTIPLE PHOTOFLASH LAMP DEVICE
Filed March 16, 1959  3 Sheets-Sheet 3
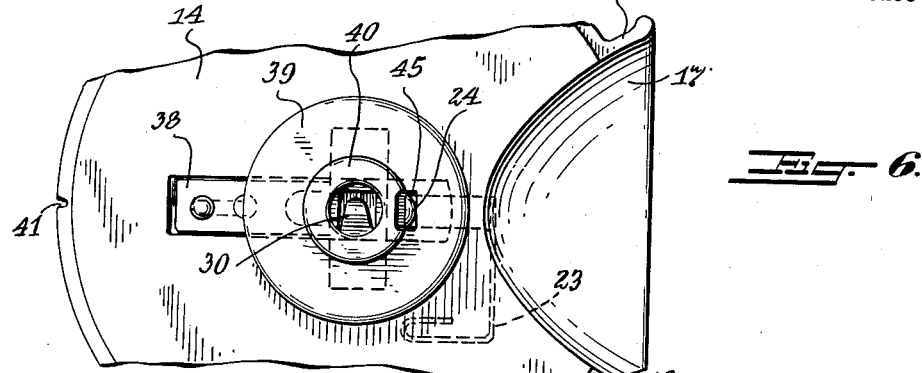
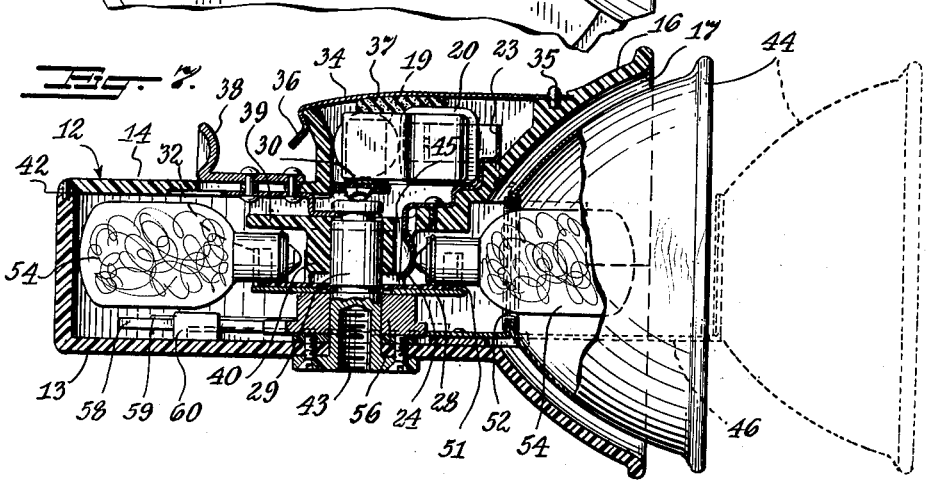
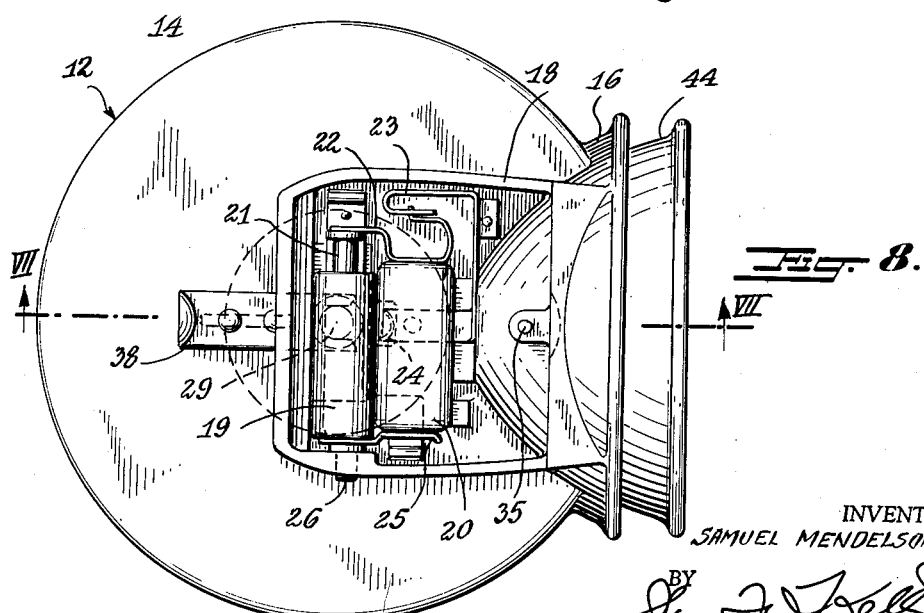
INVENTOR.
SAMUEL MENDELSOHN
ATTORNEY United States Patent Office 2,985,748
Patented May 23, 1961

2,985,748
MULTIPLE PHOTOFLASH LAMP DEVICE
Samuel Mendelsohn, 517 Ridgewood Ave., Glen Ridge, N.J.
Filed Mar. 16, 1959, Ser. No. 799,789
4 Claims. (Cl. 240—1.3)

This invention relates to photographic lighting apparatus and, more particularly, to a multiple photoflash lamp device for use in conjunction with a camera synchronizer.

Repeating type photoflash lamp devices for successively positioning a photoflash lamp within a reflector and then igniting such positioned lamp in synchronism with the opening of the camera shutter are well known in the art. Such units, however, have heretofore been awkward to carry and operate in that the loaded lamps were exteriorly mounted on the device and were indexed into position within the reflector either manually or by rather complicated actuating mechanisms, usually also exposed. More recently there have been developed units wherein the lamps are automatically fed into the reflector from a built-in magazine but because of the precision lamp-feeding and positioning mechanisms required such units necessarily are not only more expensive to manufacture but more delicate and accordingly more liable to malfunction in use.

It is accordingly the general object of the present invention to overcome the foregoing and other disadvantages and deficiencies of the prior art by the provision of a multiple photoflash lamp device which is very compact and easy to operate.

Another object is the provision of a multiple photoflash lamp device of simple rugged construction wherein the lamps together with the mechanism for holding and positioning them within the reflector are entirely enclosed.

Still another object of the present invention is the provision of a multiple photoflash lamp device which can be conveniently loaded and will successively index the loaded lamps into positive alignment with the reflector reliably and with a minimum of parts.

For a better understanding of the invention and the manner in which the aforesaid objects, and others which will become apparent to those skilled in the art as the description proceeds, reference should be had to the accompanying drawings wherein:

Fig. 1 is a perspective view on a reduced scale of the multiple photoflash lamp device of the present invention;

Fig. 2 is a plan view of the lamp holder and a plurality of photoflash lamps loaded thereon ready for insertion into the device according to the invention;

Fig. 3 is a perspective view of the unloaded multiple photoflash lamp holder illustrated in Fig. 2;

Fig. 4 is a plan view of the multiple photoflash lamp device shown in Fig. 1 but with the cover removed;

Fig. 5 is a view corresponding to Fig. 4 but with the preloaded lamp holder removed and the reflector in withdrawn position to more clearly illustrate the construction and mode of operation of the lamp indexing mechanism according to this invention;

Fig. 6 is a fragmentary plan view of the underside of the cover for the device;

Fig. 7 is a sectional view through the device taken on the line VII—VII of Fig. 8, in the direction of the arrows;

Fig. 8 is a plan view of the device shown in the preceding figures but with the cover plate of the battery compartment removed;

Fig. 9 is a perspective view of the plate contactor member employed in the device; and Fig. 10 is a schematic representation of the lamp igniting circuit.

Referring now to the drawings in detail, the multiple photoflash lamp device 12 of the present invention as therein shown comprises a casing 13 of generally flat cylindrical configuration having a cover 14. The body portion of the casing 13 and the cover 14 are provided with outwardly flared and matching segments 15 and 16, respectively, which form an enlarged inwardly concave recess 17 at the periphery of the casing. The aforesaid segments do not extend inwardly into the casing 13 but merge with the walls of their respective sections thereby defining a circumferential passageway into the interior of said casing, as shown in Figs. 4 to 7. Extending rearwardly from the flared segment 16 and protruding upwardly from the cover 14 is a generally rectangular compartment 18 containing a source of electrical energy for the ignition of a photoflash lamp, such as a battery 19 and a condenser 20. As shown in Figs. 7 and 8, and most particularly in the schematic representation of the igniting circuit illustrated in Fig. 10, one side of the battery 19 is connected through a small resistor 21 and a conductor strap 22 to the adjacent end of the condenser 20 and then to an interconnecting stepped contact strip 23 that depends downwardly into the casing 13 and has its end portion conformed to provide a spring contact disposed rearwardly of and in alignment with the axis of the concave recess 17 and said casing. The other side of the battery 19 is connected to the other end of the condenser 20 by a second conductor strap 25 which, in turn, connects with an insulated socket terminal 26 mounted on the side wall of the compartment 18 (see Figs. 1 and 8). A circular contact plate 28 rotatably mounted on a grounded shaft 29 secured to and protruding axially upward through the casing 13 connects with a grounded socket terminal 27 mounted on the aforesaid side wall of the compartment 18 through a leaf contact 30 that engages the end of the aforesaid shaft when the cover 14 is locked in place on the casing 13, as hereinafter described. The socket terminals 26 and 27 are engageable by the customary connecting cable attached to the camera synchronizer (not shown) so that opening of the camera shutter during an exposure completes the circuit to a photoflash lamp when such lamp is in engagement with the aforementioned spring contact 24 and the grounded contact plate 28.

The aforesaid electrical power source and circuit means are mounted on and are integral with the cover 14 so that when the latter is removed from the casing 13 the shaft 29 and interior of said casing are entirely exposed, as shown in Figs. 4 and 5.

The contact plate 28, as illustrated in Fig. 9, comprises a metal disc having a central aperture 31 and a plurality of upwardly protruding prongs 32. The prongs 32 are spaced equidistantly around and conform to the curvature of the edge of the contact plate 28 thereby providing a plurality of rectangular slots 33 thereat each dimensioned to receive and frictionally engage the base of a photoflash lamp and thus effect positive electrical contact therewith.

As shown in Figs. 1 and 7, the compartment 18 is provided with a cover plate 34 one end of which is suitably apertured to engage a pin 35 that protrudes from the forward wall portion of the compartment contiguous with the flared segment 16. The other end of the cover plate 34 is bent to form a spring catch 36 adapted to snap interlock with the rear wall of the compartment, which wall may be flared outwardly at its upper edge (see Fig. 7) to increase the interlocking action. A pad 37 of resilient material such as sponge rubber or the like may be affixed to the inner surface of the cover plate 34 in such position as to press against the battery 19 and condenser 20 when said cover plate is locked in position on the compartment 18 thereby maintaining the aforesaid elements in electrical engagement with the conductor straps 22 and 25 at all times.

The cover 14 is removably secured to the body portion 10 of the casing 13 by means of a latch 38 slidably mounted on the cover. As shown in Figs. 1, 7 and 8, the grippable end of the latch 38 extends rearwardly from the compartment 18 whereas the other end laterally projects into the casing 13 and is bifurcated so as to engage a circumferential groove provided in the upper end of the shaft 29. When the cover 14 is locked on the casing 13 the leaf contact 30 is firmly pressed against the end of the shaft 29 and a centrally apertured circular boss 39 and a cylindrical bearing 40, which are integral with and depend from the central portion of said cover, engage said shaft thereby securely clamping the cover 14 thereto and to the body portion of the casing 13. A slot 45 is provided in the boss 39 and the adjacent portion of the bearing 40 is cut away to permit the passage of the stepped contact strip 23 and enable the spring contact 24 at the end thereof to be depressed in a lateral direction. A cooperating notch 41 (Fig. 6) in the edge of the cover 14 and a stud 42 (Fig. 7) in the rear wall of the casing 13 may be provided to prevent rotational movement of said cover with respect to the casing when the members are assembled. The outer end of the shaft 29 may be tapped and threaded to provide a socket 43 thereby to facilitate the attachment of the multiple photoflash lamp device 12 to the camera with which it will be used.

In accordance with the present invention a concave reflector 44 is reciprocally mounted on the casing 13 by means of a U-shaped member 46 which is attached to the reflector and telescopically engages a pair of channelled tracks 47 and 48 secured to the bottom of the casing (see Figs. 4 and 5). One leg of the U-shaped member 46 is provided with an inwardly disposed tongue 49 which in cooperation with a stop 50 limits the outward travel of said U-shaped member and permits the reflector 44 to be reciprocally shifted from its normal nested position "A" (Fig. 4) within the recess 17 to position "C," a predetermined distance away from the casing 13 along a line coincident with the axis of the reflector. The reflector 44 is provided with a central opening 52 which communicates with the interior of the casing 13 through the circumferential passageway defined by the concave recess 17 and is aligned with the shaft 29. The multiple photoflash lamp device 12 as shown is provided with a preloaded lamp holder 51 which, as illustrated most particularly in Figs. 2 and 3, comprises a flat disc of insulating material, such as cardboard, fiber or similar inexpensive material, having a central opening 53 therein dimensioned to permit said holder to be slidably threaded over the shaft 29. As shown in Fig. 2, as well as in my copending application, Serial No. 654,-768, filed April 24, 1957, a plurality of photoflash lamps 54 are radially mounted on the holder 51 by any suitable means, such, for example, as staples 55 which are conformed to interlock with the base ends of said lamps and thereby maintain the lamps in loaded formation with their longitudinal axes in a common plane parallel to the plane of said lamp holder. The diameter of the lamp holder 51 is slightly less than the inside diameter of the contact plate 28 defined by the inner surfaces of the prongs 32 thereby enabling said holder to be snugly but freely inserted into nesting and seated relation within said contact plate. It should also be noted that the staples 55 are so disposed relative to the periphery of the lamp holder 51 that the light-producing portions of the photoflash lamps 54 and a considerable portion of the base ends thereof protrude beyond the edge of said holder, as shown in Fig. 2.

By reference now more particularly to Figs. 4, 5 and 7, it will be noted that the contact plate 28 is rigidly fastened to a ratchet 56 and that both these members are rotatably mounted on the shaft 29 secured to the bottom of the casing 13. The ratchet 46 has the same number of teeth 57 equally spaced around its periphery as there are photoflash lamps 54 mounted on the lamp holder 51, and is of such height that said lamps, when loaded in the device 12, are disposed in a plane that includes the axis of the reflector 44. Since the interior of the casing 13 and shaft 29 therein are exposed when the cover 14 is removed, it will be obvious that the aforesaid preloaded lamp holder 51 may be very conveniently and quickly inserted into the casing and dropped on said shaft, after the reflector 44 has been normally withdrawn from its normally nested position "A" within the recess 17 to an intermediate position B, shown in Fig. 4 and indicated in dotted lines in Fig. 5, in which latter position the reflector 44 will have been withdrawn beyond the periphery of the casing and out of the path of rotation of said lamps. To complete the loading operation the portions of the base ends of the preloaded photoflash lamps 54 which protrude beyond the edge of the lamp holder 51 are aligned with the slots 33 in the contact plate 28 and the lamp holder seated against the latter, as shown in Fig. 7, thereby forcing the exposed base portions into engagement and positive electrical contact with the prongs 32 of said contact plate. When thus loaded into the casing 13 the photoflash lamps 54 are disposed in a common plane that includes the axis of the reflector 44 (see Fig. 7) and together with the contact plate 28 and ratchet 56 are rotatable as a unit within the casing around the shaft 29. The inside diameter of the casing 13 is larger than the diameter of the circle described by the ends of the photoflash lamps 54 so as to freely permit such rotation. The photoflash lamps 54 are, accordingly, rotatable about an axis normal to the axis of the reflector 44 and are so disposed that one of said lamps is normally axially aligned with the reflector and has its light-producing portion positioned substantially at the focus thereof. Such aligned lamp also has its base end firmly seated against the yieldable spring contact 24 so that it is automatically placed into the ignition circuit and prepared for firing.

In accordance with the present invention the loaded photoflash lamps 54 are indexed successively into alignment with the reflector 44 and into registration with the central opening 52 thereof in a very convenient, reliable and positive manner by a very simple actuating mechanism. As shown in Figs. 4 and 5, such mechanism comprises a pawl 58 pivotally attached to a leg of the U-shaped member 46 and is so disposed relative to the ratchet 56 as to engage a preselected tooth 57 thereof when the reflector 44 is withdrawn to its intermediate position B. A spring 59 affixed to the aforesaid leg biases the pawl 58 inwardly toward said ratchet to insure engagement with the preselected tooth thereof. A tubular stop 60 is also mounted on said leg in encircling relationship with the pawl 58 and is so conformed and oriented as to limit the inward depression of said pawl by the spring and thereby properly position the pawl to effect the aforesaid engagement. To position a new lamp 54 in the reflector 44 said reflector is merely pulled directly outward from its normal nested position "A" within the concave recess 17 in the direction "a" (Fig. 4) to the limit of its travel to position "C," and then returned to its original position in the reverse direction "b." As shown in Figs. 4 and 5, when the reflector 44 during its outward travel reaches intermediate position "B" (indicated by the dotted outline of the reflector in Fig. 5) it is clear of the path of rotation of the photoflash lamps 54 at which time the pawl 58 engages the ratchet 57. During the subsequent outward displacement of the reflector 44 from position "B" to "C" the pawl 58 causes the ratchet 56 to rotate through a predetermined angle, such as 45° as in the instant case, thereby rotating the photoflash lamps 54 through a corresponding angle whereupon the lamp initially in said reflector is replaced by the succeeding lamp. Upon return of the reflector 44 into its normally nested position "A" within the recess 17 proximate the casing 13 the light-producing portion of the newly-positioned lamp first passes through the opening 52 in said reflector and is finally positioned substantially at the focus of said reflector. Thus, by merely reciprocally displacing the reflector 44 relative to the casing 13 the photoflash lamps 54 are automatically successively indexed into axial alignment with said reflector and into registration with the central opening 52 thereof through the position normally occupied by the reflector.

It will become apparent from the foregoing that the objects of the present invention have been achieved in that a multiple photoflash lamp device has been provided in which the loaded photoflash lamps and lamp-indexing mechanism are entirely enclosed thereby constituting a very compact unit which can be very conveniently carried by the user. Moreover, the utilization of the reflector itself as part of the lamp-indexing mechanism and the reciprocatory movement thereof to actuate said mechanism not only greatly simplifies the operation of the device but achieves the desired automatic positioning of the lamps with a minimum of parts and expense.

While one specific embodiment of the present invention has been illustrated and described, it will be understood that various modifications may be made therein without departing from the spirit and scope of the invention.

I claim:

1. A multiple photoflash lamp device comprising a casing of generally flat cylindrical configuration, a concave reflector reciprocally mounted on said casing at the periphery thereof and having its axis normal to the axis of said casing, said reflector having an opening at its apex communicating with the interior of said casing, a ratchet within said casing and rotatable about the axis thereof, a multiple photoflash lamp holder on and rotatable together with said ratchet, a plurality of photoflash lamps radially mounted on said lamp holder with their longitudinal axes in a plane including the axis of said reflector and rotatable within said casing together with said lamp holder and ratchet, said reflector being so disposed relative to the axis of said casing that one of said photoflash lamps is normally axially aligned with and positioned within said reflector through the opening at the apex thereof, means slidably carried by said casing and connected to said reflector, and a pawl carried by said slidable means operable in response to the reciprocatory travel of said reflector away from said casing to engage said ratchet and rotate it together with said lamp holder through a predetermined angle such that one of said photoflash lamps is indexed out of axial alignment with said reflector and another of said photoflash lamps is indexed into axial alignment with said reflector through the position normally occupied by the reflector, thereby successively indexing said photoflash lamps into registration with and positioning them within said reflector upon the reciprocatory displacement and return of the latter to its normal position proximate said casing.

2. A multiple photoflash lamp device comprising a generally flat cylindrical casing having a recess at and extending inwardly from its periphery, a concave reciprocally movable reflector normally nested in said recess and having a central opening communicating with the interior of said casing through a passageway in said recess, a ratchet within said casing and rotatable about the axis thereof, a multiple photoflash lamp holder attached to and rotatable together with said ratchet, a plurality of photoflash lamps radially mounted on said lamp holder with their longitudinal axes in a plane including the axis of said reflector and with their light-producing portions disposed toward the periphery of said casing, said lamp holder and photoflash lamps being rotatable together with said ratchet as a unit within said casing that is so disposed therein that one of said photoflash lamps normally protrudes into said recess and said opening in the reflector and is axially aligned with and positioned within said reflector substantially at the focus thereof, a U-shaped member connected to said reflector and telescopically engaging track means in said casing, and a pawl carried by said U-shaped member and operable after the outward reciprocatory travel of said reflector beyond the path of rotation of said photoflash lamps to engage said ratchet and rotate it together with said lamp holder and photoflash lamps through a predetermined angle such that one of said lamps is indexed out of axial alignment with said reflector and another of said lamps is indexed into axial alignment with said reflector through the position in said recess normally occupied by the reflector, thereby successively indexing said photoflash lamps into registration with and positioning them within said reflector substantially at the focus thereof upon the reciprocatory displacement and return of the latter into its normal nested relation within the recess in said casing.

3. A multiple photoflash lamp device comprising a generally flat cylindrical casing having a concave recess at and extending inwardly from its periphery, a concave reciprocally movable reflector normally nested in said recess and having a central opening communicating with the interior of said casing through a passageway in said recess, a ratchet within said casing and rotatable about the axis thereof, a multiple photoflash lamp holder attached to and rotatable together with said ratchet, a plurality of photoflash lamps radially mounted on said lamp holder with their longitudinal axes in a plane including the axis of said reflector and with their light-producing portions disposed toward the periphery of said casing, said ratchet having the same number of teeth as there are photoflash lamps on said lamp holder and being rotatable therewith as a unit within said casing that is so disposed therein that one of said photoflash lamps normally protrudes into said recess and said opening in the reflector and is axially aligned with and positioned within said reflector substantially at the focus thereof, a U-shaped member connected to said reflector and telescopically engaging a pair of channelled tracks in said casing, a pawl carried by said U-shaped member and operable after the outward reciprocatory travel of said reflector beyond the path of rotation of said photoflash lamps to engage a tooth of said ratchet and rotate it together with said lamp holder through a predetermined angle such that one of said photoflash lamps is indexed out of axial alignment with said reflector and another of said photoflash lamps is indexed into axial alignment with said reflector through the position in said recess normally occupied by the reflector, thereby successively indexing said photoflash lamps into registration with and positioning them within said reflector substantially at the focus thereof upon the reciprocatory displacement and return of the latter into its normal nested relation within the recess in said casing.

4. A multiple photoflash lamp device comprising a generally flat cylindrical casing separable into a cover and a body portion each having outwardly flared matching segments contoured to form an enlarged inwardly concave recess at the periphery of said casing, a concave reciprocally movable reflector normally nested in said recess and having a central opening communicating with the interior of said casing through a circumferential passageway defined by said recess, an upstanding closable compartment integral with the cover of said casing and extending rearwardly from the flared segment thereof dimensioned to accommodate a source of electrical energy for the ignition of a photoflash lamp, a ratchet within said casing and rotatable about the axis thereof, a multiple photoflash lamp holder attached to and rotatable together with said ratchet, a plurality of photoflash lamps radially mounted on said lamp holder with their longitudinal axes in a plane including the axis of said reflector and with their light-producing portions disposed toward the periphery of said casing, said ratchet lamp holder and photoflash lamps comprising a unit that is rotatable within said casing and so disposed therein that one of said photoflash lamps normally protrudes into said recess and said opening in the reflector and is axially aligned with and positioned within said reflector substantially at the focus thereof, a U-shaped member connected to said reflector and telescopically engaging a pair of tracks in said casing, a pawl carried by said U-shaped member and operable after the outward reciprocatory travel of said reflector beyond the path of rotation of said photoflash lamps to engage said ratchet and rotate it together with said lamp holder through a predetermined angle such that one of said photoflash lamps is indexed out of axial alignment with said reflector and another of said photoflash lamps is indexed into axial alignment with said reflector through the position in said recess normally occupied by the reflector, thereby successively indexing said photoflash lamps into registration with and positioning them within said reflector substantially at the focus thereof upon the reciprocatory displacement and return of the latter into its normal nested relation within the recess in said casing, and circuit means in said casing including a source of electrical energy within the compartment provided on the cover of said casing and adapted to cause energization of the photoflash positioned within said reflector at the will of an operator.

References Cited in the file of this patent

UNITED STATES PATENTS

| | | |
|---|---|---|
| 2,408,469 | Malloy | Oct. 1, 1946 |
| 2,408,470 | Noel et al. | Oct. 1, 1946 |
| 2,427,969 | Lester | Sept. 23, 1947 |
| 2,839,667 | Cannella | June 17, 1958 |
| 2,892,073 | Michatek et al. | June 23, 1959 |